(12) United States Patent
Griffiths

(10) Patent No.: US 6,260,349 B1
(45) Date of Patent: Jul. 17, 2001

(54) MULTI-STAGE TURBO-MACHINES WITH SPECIFIC BLADE DIMENSION RATIOS

(76) Inventor: Kenneth F. Griffiths, 415 Whitewater Ave., Fort Atkinson, WI (US) 53538

(*) Notice: Subject to any disclaimer, the term of this patent is extended or adjusted under 35 U.S.C. 154(b) by 0 days.

(21) Appl. No.: 09/527,994

(22) Filed: Mar. 17, 2000

(51) Int. Cl.[7] .................................. F02C 9/00; F01D 1/10
(52) U.S. Cl. ........................... 60/39.17; 60/39.75; 60/727
(58) Field of Search ................................ 60/39.17, 39.75, 60/726, 727; 415/198.1, 199.1, 199.5

(56) References Cited

U.S. PATENT DOCUMENTS

| | | |
|---|---|---|
| 767,250 | 8/1904 | Schneider . |
| 773,442 | 10/1904 | Webb . |
| 1,593,414 | 7/1926 | Kraft . |
| 2,243,467 | 5/1941 | Jendrassik . |
| 2,258,792 | 10/1941 | New . |
| 2,344,835 | 3/1944 | Stalker . |
| 2,407,166 | 9/1946 | Krietner et al. . |
| 2,549,819 | 4/1951 | Kane . |
| 2,584,232 * | 2/1952 | Sedille ................................ 60/39.17 |
| 2,749,025 | 6/1956 | Stalker . |
| 2,749,027 | 6/1956 | Stalker . |
| 2,830,754 | 4/1958 | Stalker . |
| 2,846,136 | 8/1958 | Zaba . |
| 2,869,820 | 1/1959 | Marchant et al. . |
| 2,870,957 | 1/1959 | Stalker . |
| 2,906,495 | 9/1959 | Schum et al. . |
| 2,920,865 | 1/1960 | Lombard . |
| 2,925,248 | 2/1960 | Stalker . |
| 2,931,173 | 4/1960 | Schapker . |
| 2,956,732 | 10/1960 | Stalker . |
| 3,245,219 | 4/1966 | Warden et al. . |
| 3,635,586 | 1/1972 | Kent et al. . |
| 4,197,700 | 4/1980 | Jahnig . |
| 4,207,027 | 6/1980 | Barry et al. . |
| 4,519,745 | 5/1985 | Rosman et al. . |
| 5,073,831 | 12/1991 | Flint . |
| 5,207,556 | 5/1993 | Frederick et al. . |
| 5,347,806 * | 9/1994 | Nakhamkin ........................ 60/39.17 |
| 5,464,322 | 11/1995 | Cunha et al. . |
| 5,468,123 | 11/1995 | Guimier et al. . |
| 5,486,091 | 1/1996 | Sharma . |
| 5,722,241 | 3/1998 | Huber . |
| 5,987,876 | 11/1999 | Ziegner . |

OTHER PUBLICATIONS

Krase, W.H., "Ericsson Cycle Gas Turbine Powerplants" Rand report, Mar. 1979, cover & pp. iii, v–vii & 1–37.

* cited by examiner

Primary Examiner—Louis J. Casaregola
(74) Attorney, Agent, or Firm—Cook, Alex, McFarron, Manzo, Cummings & Mehler, Ltd.

(57) ABSTRACT

A gas turbo-machine and method of designing and constructing such machine includes preselecting specific operating conditions for the gas turbo-machine, and constructing a master stage as a model to have a given design and geometric shape which results in substantially the optimum efficiency during operation of the master stage at the preselected operating conditions. At least one additional stage is then added to the master stage which is substantially identical to the master stage in geometric shape and design, but in which the linear dimensions of the additional stage differ from those of the master stage in accordance with the formula

$$L = \sqrt[3]{\sqrt{D}}$$

where $L$ is the ratio of the linear dimensions of the additional stage to the master stage and $D$ is the gas density ratio of the master stage. The turbo-machines of the present invention may be either axial or radial flow, compressors or gas turbines, and isothermal, adiabatic or combinations thereof in operation, and they may be utilized in the generation of electrical power.

43 Claims, 5 Drawing Sheets

MULTI-STAGE TURBO-MACHINES WITH SPECIFIC BLADE DIMENSION RATIOS

BACKGROUND AND SUMMARY OF THE INVENTION

The present invention is directed to turbo-machines and, more particularly, to multistage axial or radial gas flow compressors and turbines and systems employing such turbo-machines.

It is known that the efficiency of turbo-machines, such as compressors and gas turbines, may be substantially improved by operation in a manner which approaches isothermal conditions. This essentially means that the temperature of the gas as it moves between successive stages of the turbo-machine is adjusted so that the inlet temperature of the gas at each successive stage is maintained at about the same temperature as at the inlet of the preceding stage. This is in contrast to adiabatic operation in which the temperature of the gas changes between the successive stages due to the compression or expansion of the gas as it moves through each successive stage of the turbo-machine.

Maintenance of a constant temperature at the inlet of each successive stage may be accomplished in several different ways. In a purely isothermal gas turbine, fuel injectors and temperature sensors may be positioned in each stage so that the correct amount of fuel is injected into and burned in each stage as is needed to ensure that the temperature of the gas in the gas turbine is re-elevated to substantially the temperature at which it entered that stage prior to discharge from the stage and introduction to the next succeeding stage. This is shown for example in U.S. Pat. No. 4,197,700 (Jahnig). In a purely isothermal compressor, a coolant may be introduced into each stage, for example through the stator blades of an axial compressor, to reduce the temperature of the gas to substantially the same temperature at which it was introduced to that stage to ensure that the temperature of the gas which is discharged from the stage and introduced to the next stage is at substantially the same temperature. Combustion chambers or intercoolers have also been employed between stages to add or remove heat and alter the gas temperature so that the gas entering each of the respective stages is at substantially the same temperature.

Substantial improvements in efficiency may also be achieved in particular in compressors through the use of relatively low temperature coolants, such as sea water which is taken from below the thermocline. Such sea water will typically be about 40° F. which is sufficient to maintain a temperature of about 45° F. to the intake of each stage of an isothermal compressor.

It would also be desirable to design, for example, the first stage of the turbo-machine to achieve the maximum efficiency from a design standpoint when the turbo-machine is in normal operation. Normal operation means that each stage would have a given shaft speed, pressure ratio, temperature ratio, gas density ratio, and the type of operation in each stage would be the same, e.g. isothermal, adiabatic, etc. This optimum efficiency stage could then act as a master stage which would serve as a model for the construction of each of the subsequent stages. In the present invention a formula has been discovered for the sizing of each subsequent stage once an optimum efficiency master stage has been designed which will maximize the optimum efficiency of each subsequent stage so that it has substantially the same optimum efficiency as the optimum efficiency master stage.

It has also been discovered that the sizing formula of the present invention is applicable to all turbo-machines whether they are purely isothermal in operation, purely adiabatic in operation, or a combination of adiabatic/isothermal operation as in turbo-machines employing intercoolers or intercombustion chambers between stages to adjust the temperature of the gas to a given selected temperature prior to introduction of the gas to the next successive stage. And, it has been discovered that the sizing formula of the present invention is also equally applicable to either axial flow or radial flow turbo-machines, and to a wide range of types of turbo-machines including compressors, gas turbines and gas expanders.

Gas expanders are quite similar in construction to gas turbines, but each has a somewhat different emphasis and purpose. In both gas turbines and gas expanders the gas expands as it moves through the several successive stages. However, gas turbines generally have the purpose of generating drive shaft power, for example to power an electrical generator, whereas gas expanders have the principal function of permitting a controlled expansion of gases for the purpose of cooling the gas. Because of the similarity of construction of gas turbines and expanders, the term "gas turbine" as employed hereinafter will include both gas turbines as well as gas expanders, unless otherwise stated.

In one principal aspect of the present invention, a multi-stage gas turbo-machine includes a first stage and a second stage of differing sizes. Each stage has turbine blades which are contacted by the gas, an inlet in each stage for introducing the gas to the turbine blades in the stage, a discharge from each stage for discharging the gas from the turbine blades in the stage, and the discharge from said first stage communicates with the inlet of the second stage. The first and second stages are substantially identical to each other in design and geometric shape, but the linear dimensions of the second stage differ from those of the first stage substantially in accordance with the formula $$L = \sqrt[3]{D}$$

where L is the ratio of the linear dimensions of the second stage to the first stage and D is the gas density ratio of the first stage, and $$D = \frac{P_I/P_O}{T_I/T_O}$$

where $P_I$ is the absolute pressure of the gas entering the first stage, $P_O$ is the absolute pressure of the gas as discharged from the first stage, $T_I$ is the absolute temperature of the gas entering the first stage, and $T_O$ is the absolute temperature of the gas as discharged from the first stage.

In another principal aspect of the present invention, the gas turbo-machine includes a power transmission shaft, and at least some of the turbine blades are coupled to the shaft to rotate with the shaft, and the shaft and the rotating turbine blades of the first and second stages rotate at the same speed.

In still another principal aspect of the present invention, the gas turbo-machine is either an axial flow or a radial flow gas turbo-machine.

In still another principal aspect of the present invention, the gas turbo-machine is a compressor, and the linear dimensions of the second stage are smaller than the linear dimensions of the first stage substantially in accordance with the formula.

In still another principal aspect of the present invention, the first and second stages of the compressor are substantially isothermal.

In still another principal aspect of the present invention, the first stage of the compressor also includes stator blades, and the stator blades include an inlet and outlet for passing a coolant through the blades to cool the gas to the substantially isothermal temperature before the gas is discharged from the first stage.

In still another principal aspect of the present invention, at least the first stage of the compressor is substantially adiabatic.

In still another principal aspect of the present invention, the compressor includes an intercooler between the first stage and the second stage to cool the gas discharged from the first stage before the gas enters the inlet of the second stage.

In still another principal aspect of the present invention, the intercooler cools the gas to substantially the same temperature as the gas introduced to the inlet of the first stage.

In still another principal aspect of the present invention, the gas turbo-machine is a gas turbine, and the linear dimensions of the second stage are larger than the linear dimensions of the first stage substantially in accordance with the formula.

In still another principal aspect of the present invention, the first and second stages of the gas turbine are substantially isothermal.

In still another principal aspect of the present invention, the first stage of the gas turbine also includes a fuel injector which injects fuel into the first stage to heat the gas to the substantially isothermal temperature before it is discharged from the first stage.

In still another principal aspect of the present invention, at least the first stage of the gas turbine is substantially adiabatic.

In still another principal aspect of the present invention, the gas turbine includes a combustor between the first stage and the second stage which heats the gas discharged from the first stage before the gas enters the inlet of the second stage.

In still another principal aspect of the present invention, the combustor heats the gas to substantially the same temperature as the gas introduced to the inlet of the first stage.

In still another principal aspect of the present invention, the gas turbo-machine includes a generator for generating electrical power, and the aforementioned power transmission shaft mechanically couples the turbine blades with the generator.

In still another principal aspect of the present invention, the gas turbo-machine with the generator includes a compressor and a gas turbine, one or both of which includes the aforementioned first and second stages. The gas from the compressor is discharged to the gas turbine, and a heat exchanger (regenerator) is positioned between the compressor and the gas turbine. The discharge from the gas turbine is used to heat the gas being discharged from the compressor before it is introduced to the gas turbine with the heat content of the gas which is discharged from the gas turbine.

In still another principal aspect of the present invention, water is introduced to the first stage of the compressor from below the thermocline of a large body of water, the first stage also includes stator blades, and the stator blades include an inlet and outlet for passing the water through the blades to cool the gas to the substantially isothermal temperature before the gas is discharged from the first stage.

In still another principal aspect of the present invention, a method of designing and constructing a multistage gas turbo-machine comprises preselecting the operating conditions for the gas turbo-machine of gas pressure ratio, gas intake temperature and gas flow rate. A master stage is constructed to have a given design and geometric shape which results in substantially the optimum efficiency during operation of the master stage under the preselected operating conditions. At least one additional stage is then constructed which is substantially identical to the master stage in geometric shape and design, but in which the linear dimensions of the additional stage differ from those of the master stage substantially in accordance with the aforementioned formula.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

Figures 1, 6:
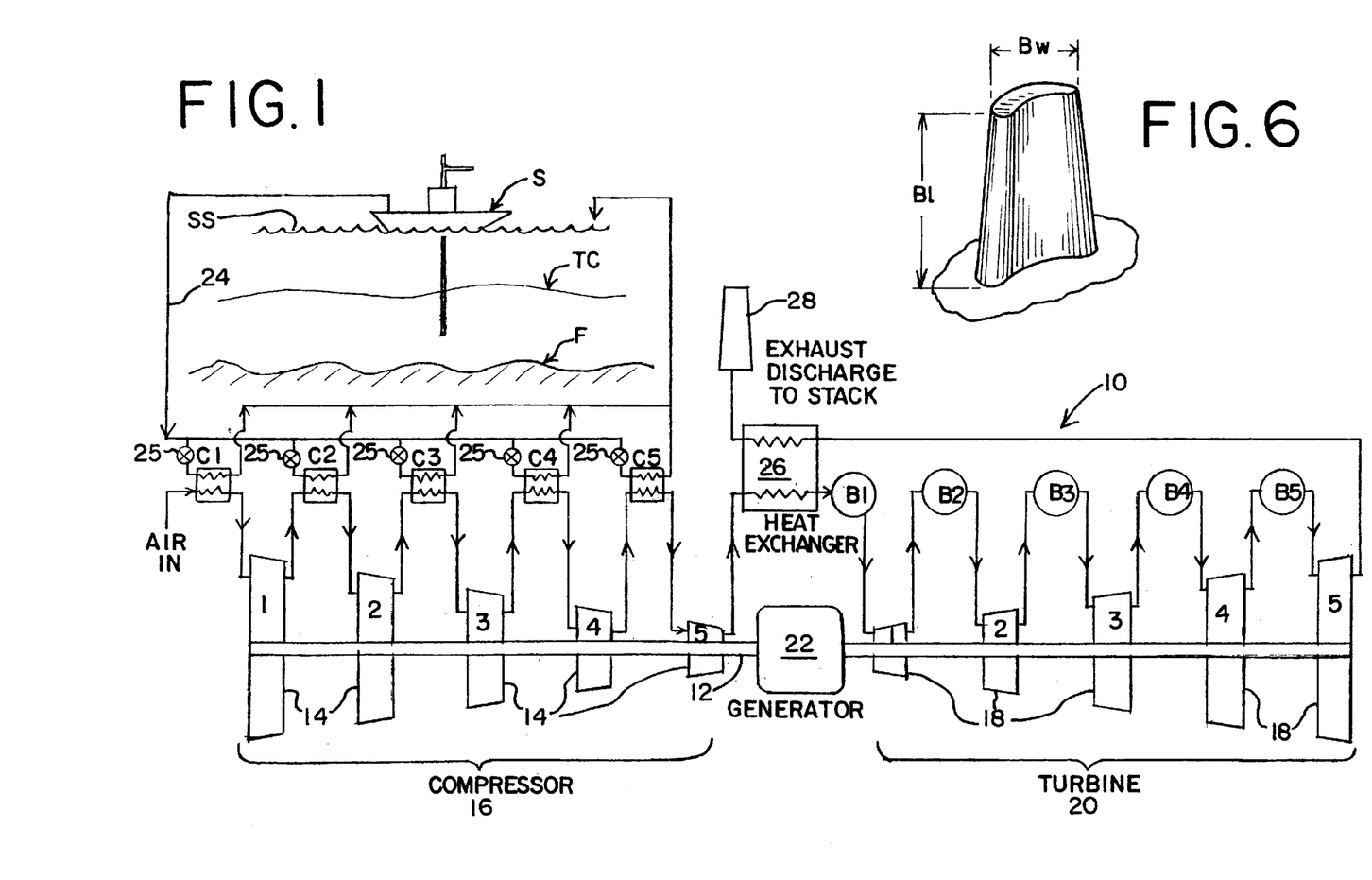
FIG. 1 is a schematic depiction of an electric power generation system utilizing one or more turbo-machines of the present invention, and incorporating intercoolers and/or intercombustors between the stages of the turbo-machines to adjust the temperatures therebetween.
FIG. 6 is a broken, partial isometric view of a typical rotor or stator blade of a turbo-machine.

With particular reference to FIG. 1, a schematic depiction of a power generation system is shown which incorporates one or more of the preferred turbo-machines, i.e. compressors and/or gas turbines, constructed in accordance with the present invention. The power generation system 10 as shown in FIG. 1, preferably includes a single axial drive shaft 12 to which the rotors 14 of each of the stages of a compressor 16 constructed in accordance with the principles of the present invention are mechanically coupled to be driven by the drive shaft 12. As seen in the drawings, the compressor 16 is shown as comprising five stages 1–5. However, it will be appreciated that the compressor 16 may consist of more or less than five stages.

Also mechanically coupled to the drive shaft 12 are the rotors 18 of a gas turbine 20. As such, the rotors 18 will power the drive shaft 12 and the compressor 16, as well as an electrical generator 22, which is also coupled to the drive shaft 12 to generate electrical power.

The system shown in FIG. 1 comprises a plurality of intercoolers C1–C5 through which the incoming air which is to be compressed in the compressor 16 is circulated between each stage 1–5 of the compressor 16. The intercoolers C1–C5 preferably adjust the temperature of the gas between each stage just before the gas enters the next stage so that the gas is at substantially the same temperature as the gas which entered the preceding stage.

The intercoolers C1–C5 are cooled by a suitable coolant source which, as shown in FIG. 1, is sea water. The sea water is preferably pumped from about 500–1500 feet below the surface and below the thermocline TC, but a sufficient distance above the sea floor F to prevent sediment and other bottom debris from being drawn into the coolant system. The temperature beneath the thermocline TC is typically quite low and may be on the order of about 40° F. This should insure that the temperature of the gas passing through the compressor 16 and between its stages can be as low as 45° F. Such temperatures should result in a highly efficient optimum system. Pumping of the sea water may be accomplished by a suitable pumping station, such as ship S shown in FIG. 1, which discharges the coolant through a main 24 to the intercoolers C1–C5. The intercoolers C1–C5 are preferably arranged in parallel to the main 24 so that the coolant to each intercooler may be individually controlled by valves 25 as needed to maintain the desired substantially uniform gas temperature at each stage. The coolant is discharged from the intercoolers C1–C5 back to the environment, for example to the surface SS of the sea as shown in FIG. 1.

Also as shown in FIG. 1, interburners B1–B5 are positioned in combustion chambers between each of the stages 1–5 of the turbine 20. These burners receive the compressed air from the last stage 5 of compressor 16 via a heat exchanger or regenerator 26. The heat exchanger 26 preheats the incoming compressed air to the turbine burner B1 with the heat which has been scavenged from the hot gasses which are exhausted from the last stage 5 of the turbine 20. This preheating and scavenging also greatly optimizes and improves the efficiency of the system, as well as cools the discharged exhaust gases from the last stage 5 of the turbine 20 to prepare those gases for discharge to the environment, such as through an exhaust stack 28. The purpose of the interburners B1–B5 is to add energy to the gas passing between the stages to reheat the gas just before it enters the next stage to a temperature which is substantially the same temperature as the gas which entered the preceding stage.

It will be appreciated that the power generation system shown in FIG. 1 and thus far described in relation to that figure, is effectively a hybrid adiabatic/isothermal system. That is a system in which the temperature of the gas will rise between the inlet and discharge from any given stage in the compressor, and will fall between the inlet and discharge of any given stage in the turbine as it would in a simple, conventional purely adiabatic compressor and/or turbine. In such conventional adiabatic turbo-machines the gas which is discharged from a stage at whatever its temperature is after passing through that stage is simply introduced to the inlet of the next succeeding stage. In such conventional adiabatic system, the gas discharged from a stage and introduced to the next succeeding stage is cooler in the case of a turbine and hotter in the case of a compressor than when it was introduced to the stage from which it is being discharged. However, in the hybrid adiabatic/isothermal system shown in FIG. 1, the gas discharged from each preceding stage is cooled by the intercoolers C1–C5 in the case of the compressor and heated by the interburners B1–B5 in the case of the turbine to a temperature which is approximately equal to the temperature of the gas introduced in the preceding stage. Thus, the system shown in FIG. 1 closely approaches isothermal operation and the high efficiencies that are realized by such isothermal turbo-machines.

Figure 2:
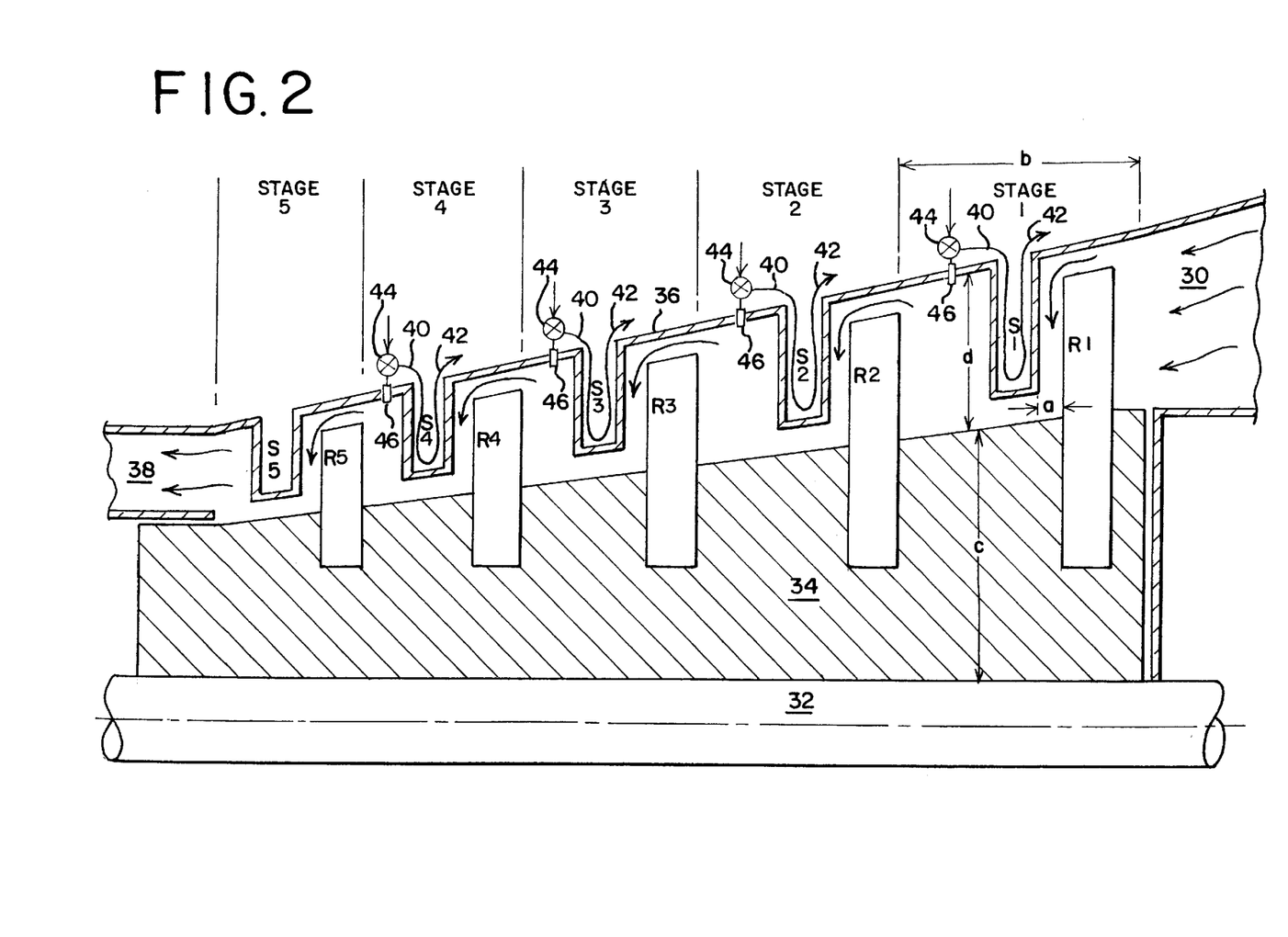
FIG. 2 is a broken, partial, cross-sectioned elevation view of a portion of a preferred embodiment of an isothermal axial compressor in accordance with the invention.
Figure 3:
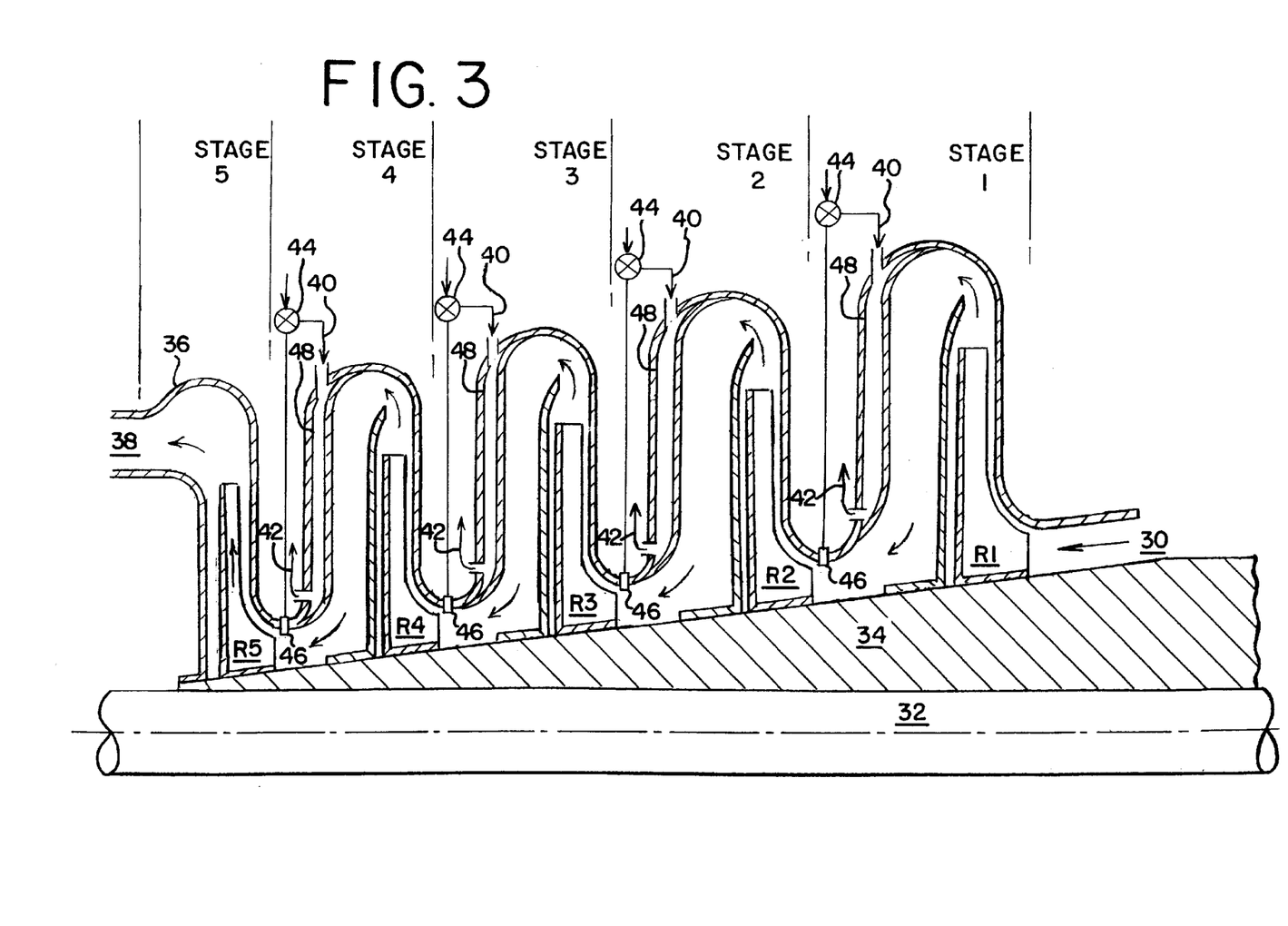
FIG. 3 is a broken, partial, cross-sectioned elevation view of a portion of a preferred embodiment of an isothermal radial compressor in accordance with the invention.
Figure 4:
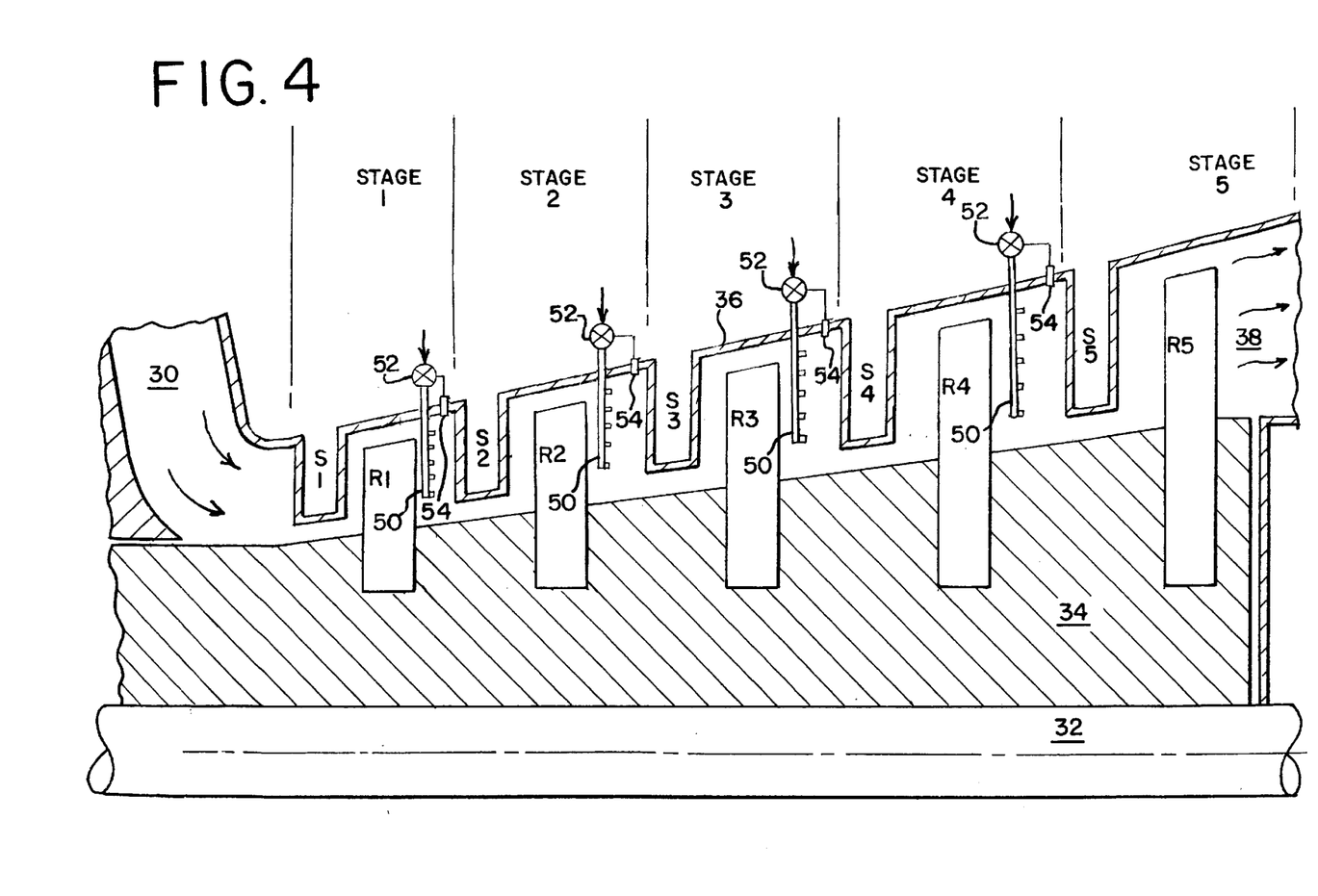
FIG. 4 is a broken, partial, cross-sectioned elevation view of a portion of a preferred embodiment of an isothermal axial turbine in accordance with the invention.
Figure 5:
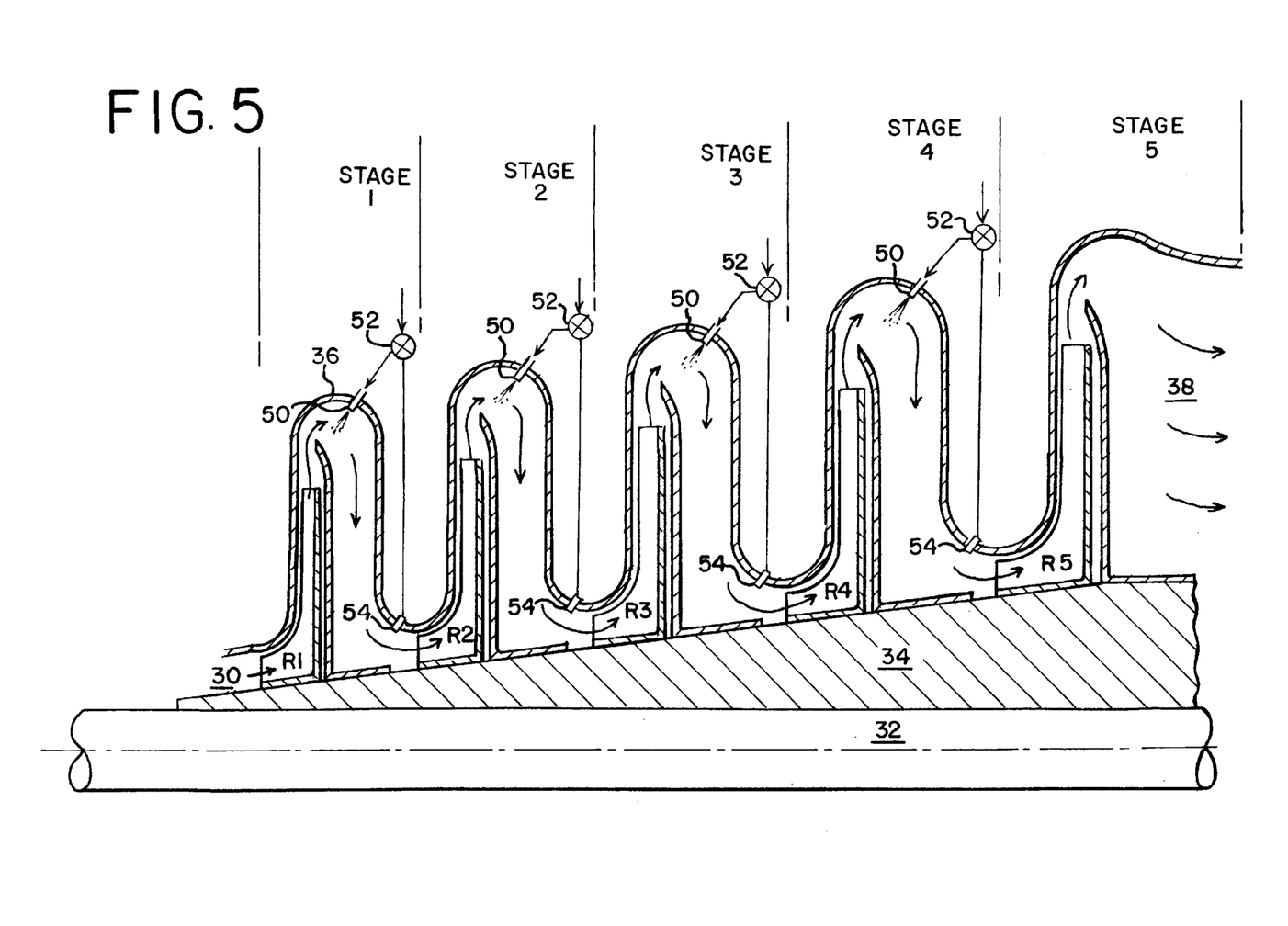
FIG. 5 is a broken, partial, cross-sectioned elevation view of a portion of a preferred embodiment of an isothermal radial turbine in accordance with the invention.

As previously mentioned, the turbo-machines of the invention may be either axial flow or radial flow compressors or gas turbines. An axial flow compressor in accordance with the invention is shown in FIG. 2; a radial flow compressor is shown in FIG. 3; an axial flow turbine is shown in FIG. 4; and a radial flow turbine is shown in FIG. 5. In the axial flow turbo-machines, the gas is introduced via an intake 30 as seen in the compressor in FIG. 2 and the turbine in FIG. 4. The gas will then flow past the series of stators S1–S5 and rotors R1–R5 in each of the stages, five of which are shown in FIGS. 2 and 4. The direction of the gas flow is shown by the arrows in FIGS. 2 and 4. The rotors R1–R5 are mechanically mounted to a drive shaft 32 in any suitable known manner, such as by way of a frustoconical element 34 as seen in FIGS. 2 and 4, so that the rotor blades rotate with and at the same speed as the drive shaft 32. The stators S1– are stationarily mounted to the housing 36 of the turbo-machine. In the axial turbo-machines, the gas passes sequentially through each stage and the rotor and stator blades in each stage. Once the gas has finally passed completely through all of the stages, it is discharged through an exhaust outlet 38. In the case of the compressor shown in FIG. 2, it will be seen that the size of each stage as the gas progressively moves through the turbo-machine decreases due to the compression of the gas. Thus, stage 1 is larger than stage 2 which is larger than stage 3, etc. Conversely, the size of each stage in the turbine as shown in FIG. 4 increases as the gas progressively moves through the turbo-machine due to the expansion of the gas in the turbine.

The radial flow compressor shown in FIG. 3 and gas turbine shown in FIG. 5 have similar elements in common to the axial flow machines previously described including an intake 30, a drive shaft 32, frustoconical drive element 34, a housing 36 and an exhaust outlet 38. The direction of the gas flow again is shown by the arrows in FIGS. 3 and 5. The radial flow turbo-machines do differ from the axial flow machines in certain details. One is that the gas as it passes through the radial machines is discharged from the rotors in a radial centrifugal manner, rather than in the axial flow direction in the axial machines. Also, because of the radial flow of the gas, the stators are not needed in the radial machines and are eliminated. However, like the axial flow turbo-machines, the sizes of the successive stages decrease toward the exhaust outlet in the radial flow compressor shown in FIG. 3, and increase toward the exhaust outlet in the radial flow gas turbine shown in FIG. 5.

The axial and radial turbo-machines thus far described and without further modifications will operate in a typical adiabatic fashion. In adiabatic operation, as the gas moves through the turbo-machine, its temperature and pressure will change by a certain amount in each stage. For example, when air is introduced to the intake 30 of the compressor it may be at ambient temperature and pressure. However, as it progressively moves through each of the stages 1–5 of the compressor, it will be progressively compressed, and its temperature will elevate from stage to stage until it is ultimately discharged from the compressor at a final temperature and pressure which is substantially greater than the ambient input air. Conversely, as a flow of heated gas under pressure is introduced to a gas turbine in adiabatic operation, the gas will expand as it moves through each of the stages, and its pressure and temperature will drop from stage to stage so that the gas which is ultimately discharged from the exhaust outlet 38 in an adiabatic gas turbine will have a much greater volume and lower pressure and temperature than the gas which was introduced initially to the intake 30. Thus, in such purely adiabatic turbo-machines, the temperature of the gas as it is introduced to each successive stage is essentially the temperature of the gas as it was discharged from the preceding stage.

The present invention is not only directed to such purely adiabatic turbo-machines, but also to isothermal turbo-machines and adiabatic/isothermal hybrids of such machines. An adiabatic/isothermal hybrid is schematically depicted in FIG. 1 in which the operation in each of the stages 1–5 is adiabatic, i.e. increases in pressure and temperature between the intake of a given stage and the discharge from the stage in the case of a compressor, and decreases in pressure and temperature between the intake of a given stage and the discharge from that stage in the case of a gas turbine. However, in the system shown in FIG. 1, this change in temperature is adjusted and compensated by the intercoolers C1–C5 between the stages in the case of the compressor 16 and the interburners or combustors B1–B5 between the stages in the turbine 20. These intercoolers and interburners are preferably controlled to cool the gas which is discharged from a stage of the compressor 16 or heat the gas which is discharged from a stage of the turbine 20 to return the gas to its initial temperature as it entered the intake of the preceding stage and before it is introduced to the next stage. This, in effect, adjusts the adiabatic turbo-machine operation to perform in a manner quite similar to an isothermal machine in which adjustments are made to the gas temperature within the confines of each stage to maintain a constant temperature throughout the machine as will be next discussed. This intercooler and interburner temperature adjustment greatly improves the efficiency of the turbo-machines. The turbo-machines in the system of FIG. 1 may be either axial or radial flow machines.

The axial compressor shown in FIG. 2 has been modified to function as closely as possible to a pure isothermal compressor. As such, each of the stator blades S1–S5 includes an inlet 40 and discharge 42 for the flow of coolant through the stator blades of each stage. The flow of coolant is preferably controlled by a control valve 44 which is operated by a suitable temperature sensor 46 in each stage to sense the temperature of the gas as it is leaving the stage and adjust the flow of coolant accordingly. The coolant may be any suitable source of coolant, including the sea water coolant from below the thermocline as discussed with respect to the system shown in FIG. 1.

Thus, it will be seen that in operation as the air to be compressed in the compressor of FIG. 2 enters through the intake 30, it will be directed to the rotor blades R1 in stage 1. The rotor blades R1 are driven by the drive shaft 32 and frustoconical element 34 and will compress the gas to raise its pressure and temperature in stage 1. This gas will then be directed by the stator blades S1 at the discharge of stage 1 to the rotor blades R2 of the next stage 2. However, the coolant in the stator blades S1 in stage 1 will cool the gas which has been compressed in stage 1, preferably to approximately the temperature that that same gas entered stage 1 prior to compression. Thus, the gas discharged from stage 1 will enter stage 2 ideally at the same temperature that it entered stage 1. This is classic isothermal operation.

Cooling of the gas also occurs in the radial compressor depicted in FIG. 3. As in the axial compressor of FIG. 2, the radial compressor shown in FIG. 3 also includes an inlet 40 and discharge 42 for coolant, but instead the coolant flows through a jacket 48 in the housing 36 in each of the stages 1–5 in contrast to the circulation through the stator blades in the axial flow compressor. Again, the coolant flow may be controlled as desired by way of a temperature sensor 46 and control valve 44 as previously described. In operation, the gas to be compressed in the radial flow turbo-machine of FIG. 3 enters through the intake 30 and is compressed by the rotor R1 in stage 1. However, before the gas leaves stage 1, it will be cooled ideally to the temperature that it entered stage 1 by the coolant jacket 48 in stage 1 with the flow of coolant being controlled by control valve 44 which, in turn, is controlled by the temperature sensor 46. Thus, the gas entering stage 2 will be at the same temperature which it entered stage 1. This is classic isothermal operation.

The axial gas turbine shown in FIG. 4 also has been modified to function as closely as possible to a pure isothermal turbine. As such, a fuel injector 50 is positioned between each of the stator blades S1–S5 and their respective rotor blades R1–R5 to inject fuel to be burned in each stage. The flow of fuel is preferably controlled by a control valve 52 which is operated by a suitable temperature sensor 54 in each stage to sense the temperature of the gas as it is leaving the stage and adjust the flow of fuel accordingly.

Thus it will be seen that in operation as the gas to propel the turbine of FIG. 4 enters through the intake 30, it will be directed to the stator blades S1 in stage 1. The rotor blades R1 drive the drive shaft 32 and frustoconical element 34 when they are rotated by the gas, and the gas pressure and temperature will drop in stage 1 as the gas passes the rotor blades R1. The gas leaving the rotor blades R1 will then flow to the stator blades S2 and the rotor blades R2 of the next stage 2. However, the fuel injected by the fuel injector 50 in stage 1 will heat the gas in stage 1, preferably to approximately the temperature that the same gas entered stage 1 prior to expansion. Thus, the gas discharged from stage 1 will enter stage 2 ideally at the same temperature that it entered stage 1. Again, this is classic isothermal operation.

Heating of the gas also occurs in the radial gas turbine depicted in FIG. 5. As in the axial turbine of FIG. 4, the radial turbine shown in FIG. 5 also includes a fuel injector 50 for fuel in each stage. Again, the fuel flow may be controlled as desired by way of a control valve 52 and temperature sensor 54 and as previously described. In operation, the gas to drive the radial flow turbo-machine of FIG. 5 enters through the intake 30 and drives the rotor R1 in stage 1. However, before the gas leaves stage 1, it will be reheated ideally to the temperature that it entered stage 1 by the fuel injector 50 in stage 1 with the flow of fuel being controlled by control valve 52 which, in turn, is controlled by the temperature sensor 54. Thus, the gas entering stage 2 will be at the same temperature which it entered stage 1. Again, this is classic isothermal operation.

It will be appreciated that although the stator blades or the cooling jackets have been described to achieve cooling in the case of the compressors and fuel injectors have been described to achieve heating in the case of the gas turbines, other thermal management elements may be employed as long as they are capable of achieving their intended purposes and do not physically impair the operation of the turbo-machines.

An important feature of the present invention is the manner in which the respective stages are sized relative to each other.

In the present invention one stage is selected to be a master or model stage and it is designed to be of optimal efficiency based upon given operating parameters for the turbo-machine. These operating parameters include shaft speed, pressure ratio, type of gas processing (adiabatic, isothermal, etc.), temperature ratio and gas density ratio. Once the optimum design features and geometric shape of the master stage is determined, this master stage then serves as a model for the design features and geometric shape of the remaining stages. The remaining stages will then have substantially the same design features and geometric shape as the master stage, but will be sized differently relative to the parameters in accordance with the formula of the invention.

In accordance with the invention, the ratio of linear dimensions L of two adjacent stages is determined by the formula $$L = \sqrt[3]{D}$$

where D is the gas density ratio of the master stage (and each of the successive remaining stages). The gas density ratio D is governed by the formula $$D = \frac{P_I / P_O}{T_I / T_O}$$

where $P_I$ is the absolute pressure of the gas entering the stage in question, $P_O$ is the absolute pressure of the gas as discharged from the stage in question, $T_I$ is the absolute temperature of the gas entering the stage in question, and $T_O$ is the absolute temperature of the gas as discharged from the stage in question.

Once the ratio of linear dimensions L is determined for a given turbo-machine, each and every linear dimension of a given stage is multiplied by this ratio to determine the comparable linear dimension in the next successive stage. For example and with reference to FIG. 6, if the blade length B1 in a given stage of a rotor and/or stator would be 10 inches, and the blade width Rw of the rotor and/or stator is one inch, and the linear dimension ratio L is 1.201, the comparable blade length B1 in the next successive stage will be 10×1.201=12.01 inches, the comparable blade width Bw will be 1×1.201=1.201 inches, and the geometric shape of the respective blades of each stage will be identical to each other. This is also true of all of the other linear dimensions in each of the stages, such as for example with reference to FIG. 2, the distance between the rotors and stators a, the length of the stage b, the radius of the frustoconical element c, the distance between the frustoconical element and the housing d, etc.

The master stage as discussed herein may be anywhere in the multistage turbo-machine. It may be the first stage in which case all subsequent stages increase or decrease in size of corresponding linear dimensions depending on whether the turbo-machine is a compressor or gas turbine. The master stage also may be one of the middle stages, in which case the stages on opposite sides of the master stage both decrease and increase accordingly in linear dimensions.

EXAMPLE 1

The following calculations are presented by way of example for the sizing of a gas turbine having five stages, and operating conditions including an initial intake gas pressure of 32 atm absolute, a pressure ratio ($P_I/P_O$) of 2, and an initial intake gas temperature of 1500° R which would decrease to 1300° R in the first stage if the temperature was not adjusted. The linear dimension ratio L of such turbine under such operating conditions as calculated in accordance with the invention are set forth in the following Tables 1A–1C together with the manner in which the linear dimension ratio L has been calculated for three types of gas turbine: (1) pure isothermal, (2) hybrid (adiabatic/isothermal), and (3) pure adiabatic. In addition and by way of example, the actual lengths of one of the components of each stage are calculated for each stage and set forth in the Tables 1A–1C, e.g. for a blade length B1 as shown in FIG. 6 of 10.00 inches for the master stage.

TABLE 1A

Gas Turbine - Pure Isothermal

| Stage | $P_I$ atm abs | $P_o$ atm abs | $T_I$ °R | $T_o$ °R | Calculations $\sqrt[3]{\frac{P_I/P_O}{T_I/T_O}}$ | Ratio of Ratio of Linear Dimensions L | Blade Length B1 |
|---|---|---|---|---|---|---|---|
| 1 | 32 | 16 | 1500 | 1500 | $\sqrt[3]{\frac{32/16}{1500/1500}} = \sqrt[3]{\frac{2}{1}} =$ | 1.25999 | 10.00 |
| 2 | 16 | 8 | 1500 | 1500 | $\sqrt[3]{\frac{16/8}{1500/1500}} = \sqrt[3]{\frac{2}{1}} =$ | 1.25999 | 12.60 |
| 3 | 8 | 4 | 1500 | 1500 | $\sqrt[3]{\frac{8/4}{1500/1500}} = \sqrt[3]{\frac{2}{1}} =$ | 1.25999 | 15.88 |
| 4 | 4 | 2 | 1500 | 1500 | $\sqrt[3]{\frac{4/2}{1500/1500}} = \sqrt[3]{\frac{2}{1}} =$ | 1.25999 | 20.00 |
| 5 | 2 | 1 | 1500 | 1500 | $\sqrt[3]{\frac{2/1}{1500/1500}} = \sqrt[3]{\frac{2}{1}} =$ | 1.25999 | 25.20 |

TABLE 1B

Gas Turbine - Hybrid (Adiabatic/Isothermal)

| Stage | $P_I$ atm abs | $P_o$ atm abs | $T_I$ °R | $T_o$ °R | Calculations $\sqrt[3]{\dfrac{P_I/P_O}{T_I/T_O}}$ | Ratio of Ratio of Linear Dimensions L | Blade Length B1 |
|---|---|---|---|---|---|---|---|
| 1 | 32 | 16 | 1500 | 1300 | $\sqrt[3]{\dfrac{32/16}{1500/1300}} = \sqrt[3]{\dfrac{2}{1.1538}} = \sqrt[3]{1.7334} =$ | 1.201 | 10.00 |
| 2 | 16 | 8 | 1500 | 1300 | $\sqrt[3]{\dfrac{16/8}{1500/1300}} = \sqrt[3]{\dfrac{2}{1.1538}} = \sqrt[3]{1.7334} =$ | 1.201 | 12.01 |
| 3 | 8 | 4 | 1500 | 1300 | $\sqrt[3]{\dfrac{8/4}{1500/1300}} = \sqrt[3]{\dfrac{2}{1.1538}} = \sqrt[3]{1.7334} =$ | 1.201 | 14.42 |
| 4 | 4 | 2 | 1500 | 1300 | $\sqrt[3]{\dfrac{4/2}{1500/1300}} = \sqrt[3]{\dfrac{2}{1.1538}} = \sqrt[3]{1.7334} =$ | 1.201 | 17.32 |
| 5 | 2 | 1 | 1500 | 1300 | $\sqrt[3]{\dfrac{2/1}{1500/1300}} = \sqrt[3]{\dfrac{2}{1.1538}} = \sqrt[3]{1.7334} =$ | 1.201 | 20.81 |

TABLE 1C

Gas Turbine - Pure Adiabatic

| Stage | $P_I$ atm abs | $P_o$ atm abs | $T_I$ °R | $T_o$ °R | Calculations $\sqrt[3]{\dfrac{P_I/P_O}{T_I/T_O}}$ | Ratio of Ratio of Linear Dimensions L | Blade Length B1 |
|---|---|---|---|---|---|---|---|
| 1 | 32 | 16 | 1500 | 1300 | $\sqrt[3]{\dfrac{32/16}{1500/1300}} = \sqrt[3]{\dfrac{2}{1.1538}} = \sqrt[3]{1.7334} =$ | 1.201 | 10.00 |
| 2 | 16 | 8 | 1300 | 1127 | $\sqrt[3]{\dfrac{16/8}{1300/1127}} = \sqrt[3]{\dfrac{2}{1.1538}} = \sqrt[3]{1.7334} =$ | 1.201 | 12.01 |
| 3 | 8 | 4 | 1227 | 977 | $\sqrt[3]{\dfrac{8/4}{1127/977}} = \sqrt[3]{\dfrac{2}{1.1538}} = \sqrt[3]{1.7334} =$ | 1.201 | 14.42 |
| 4 | 4 | 2 | 977 | 846 | $\sqrt[3]{\dfrac{4/2}{977/846}} = \sqrt[3]{\dfrac{2}{1.1538}} = \sqrt[3]{1.7334} =$ | 1.201 | 17.32 |
| 5 | 2 | 1 | 847 | 734 | $\sqrt[3]{\dfrac{2/1}{847/734}} = \sqrt[3]{\dfrac{2}{1.1538}} = \sqrt[3]{1.7334} =$ | 1.201 | 20.81 |

EXAMPLE 2

The following calculations are presented by way of example for the sizing of a gas compressor, similar to the gas turbine of Example 1, having five stages, and operating conditions including an initial intake gas pressure of 1 atm absolute, a pressure ratio ($P_I/P_O$) of 2, and an initial intake gas temperature of 530° R which would increase to 612° R in the first stage if the temperature was not adjusted. The linear dimension ratio L of such compressor under such operating conditions as calculated in accordance with the invention are set forth in the following Tables 2A–2C together with the manner in which the linear dimension ratio L has been calculated for three types of gas compressor: (1) pure isothermal, (2) hybrid (adiabatic/isothermal), and (3) pure adiabatic. In addition and by way of example, the actual lengths of one of the components of each stage are calculated for each stage and set forth in Tables 2A–2C, e.g. for a blade length B1 as shown in FIG. 6 of 10.00 inches for the master stage.

TABLE 2A

Gas Compressor - Pure Isothermal

| Stage | $P_I$ atm abs | $P_o$ atm abs | $T_I$ °R | $T_o$ °R | Calculations $\sqrt[3]{\dfrac{P_I/P_O}{T_I/T_O}}$ | Ratio of Ratio of Linear Dimensions L | Blade Length B1 |
|---|---|---|---|---|---|---|---|
| 1 | 1 | 2 | 530 | 530 | $\sqrt[3]{\dfrac{1/2}{530/530}} = \sqrt[3]{\dfrac{5}{1}} =$ | 0.7937 | 10.00 |
| 2 | 2 | 4 | 530 | 530 | $\sqrt[3]{\dfrac{2/4}{530/530}} = \sqrt[3]{\dfrac{5}{1}} =$ | 0.7937 | 7.94 |
| 3 | 4 | 8 | 530 | 530 | $\sqrt[3]{\dfrac{4/8}{530/530}} = \sqrt[3]{\dfrac{5}{1}} =$ | 0.7937 | 6.30 |
| 4 | 8 | 16 | 530 | 530 | $\sqrt[3]{\dfrac{8/16}{530/530}} = \sqrt[3]{\dfrac{5}{1}} =$ | 0.7937 | 5.00 |
| 5 | 16 | 32 | 530 | 530 | $\sqrt[3]{\dfrac{16/32}{530/530}} = \sqrt[3]{\dfrac{5}{1}} =$ | 0.7937 | 3.97 |

TABLE 2B

Gas Compressor - Hybrid (Adiabatic/Isothermal)

| Stage | $P_I$ atm abs | $P_o$ atm abs | $T_I$ °R | $T_o$ °R | Calculations $\sqrt[3]{\dfrac{P_I/P_O}{T_I/T_O}}$ | Ratio of Ratio of Linear Dimensions L | Blade Length B1 |
|---|---|---|---|---|---|---|---|
| 1 | 1 | 2 | 530 | 612 | $\sqrt[3]{\dfrac{1/2}{530/612}} = \sqrt[3]{\dfrac{.5}{0.866}} = \sqrt[3]{0.577} =$ | 0.833 | 10.00 |
| 2 | 2 | 4 | 530 | 612 | $\sqrt[3]{\dfrac{2/4}{530/612}} = \sqrt[3]{\dfrac{.5}{0.866}} = \sqrt[3]{0.577} =$ | 0.833 | 8.33 |
| 3 | 4 | 8 | 530 | 612 | $\sqrt[3]{\dfrac{4/8}{530/612}} = \sqrt[3]{\dfrac{.5}{0.866}} = \sqrt[3]{0.577} =$ | 0.833 | 6.94 |
| 4 | 8 | 16 | 530 | 612 | $\sqrt[3]{\dfrac{8/16}{530/612}} = \sqrt[3]{\dfrac{.5}{0.866}} = \sqrt[3]{0.577} =$ | 0.833 | 5.78 |
| 5 | 16 | 32 | 530 | 612 | $\sqrt[3]{\dfrac{16/32}{530/612}} = \sqrt[3]{\dfrac{.5}{0.866}} = \sqrt[3]{0.577} =$ | 0.833 | 4.81 |

TABLE 2C

Gas Compressor - Pure Adiabatic

| Stage | $P_I$ atm abs | $P_o$ atm abs | $T_I$ °R | $T_o$ °R | Calculations $\sqrt[3]{\dfrac{P_I/P_O}{T_I/T_O}}$ | Ratio of Ratio of Linear Dimensions L | Blade Length B1 |
|---|---|---|---|---|---|---|---|
| 1 | 1 | 2 | 530 | 612 | $\sqrt[3]{\dfrac{1/2}{530/612}} = \sqrt[3]{\dfrac{.5}{0.866}} = \sqrt[3]{0.577} =$ | 0.833 | 10.00 |
| 2 | 2 | 4 | 612 | 707 | $\sqrt[3]{\dfrac{2/4}{612/707}} = \sqrt[3]{\dfrac{.5}{0.866}} = \sqrt[3]{0.577} =$ | 0.833 | 8.33 |
| 3 | 4 | 8 | 707 | 816 | $\sqrt[3]{\dfrac{4/8}{707/816}} = \sqrt[3]{\dfrac{.5}{0.866}} = \sqrt[3]{0.577} =$ | 0.833 | 6.94 |
| 4 | 8 | 16 | 816 | 942 | $\sqrt[3]{\dfrac{8/16}{816/942}} = \sqrt[3]{\dfrac{.5}{0.866}} = \sqrt[3]{0.577} =$ | 0.833 | 5.78 |
| 5 | 16 | 32 | 942 | 1088 | $\sqrt[3]{\dfrac{16/32}{942/1088}} = \sqrt[3]{\dfrac{.5}{0.866}} = \sqrt[3]{0.577} =$ | 0.833 | 4.81 |

It will be understood that the preferred embodiments of the present invention as have been described are merely illustrative of the principles of the present invention. Numerous modifications may be made by those skilled in the art without departing from the true spirit and scope of the invention.

What is claimed is:

1. A multistage gas turbo-machine comprising a first stage and a second stage of differing sizes, each stage having turbo-machine blades which are contacted by the gas, an inlet in each stage for introducing the gas to the turbo-machine blades in the stage, a discharge from each stage for discharging the gas from the turbo-machine blades in the stage, and the discharge from one said stage communicating with the inlet of the other said stage; and wherein said first and second stages are substantially identical to each other in design and geometric shape, but in which the linear dimensions of said second stage differ from those of said first stage substantially in accordance with the formula $$L = \sqrt[3]{\sqrt{D}}$$

where L is the ratio of the linear dimensions of the second stage to the first stage when said second stage is downstream of said first stage, and D is the gas density ratio of said first stage, and $$D = \dfrac{P_I/P_O}{T_I/T_O}$$

where $P_I$ is the absolute pressure of the gas entering said first stage, $P_O$ is the absolute pressure of the gas as discharged from said first stage, $T_I$ is the absolute temperature of the gas entering said first stage, and $T_O$ is the absolute temperature of the gas as discharged from said first stage.

2. The gas turbo-machine of claim 1, including a power transmission shaft, and wherein at least some of said turbo-machine blades are coupled to said shaft to rotate with said shaft, and said shaft and the rotating turbo-machine blades of said first and second stages rotate at the same speed.

3. The gas turbo-machine of claim 2, wherein said machine is either an axial flow or a radial flow gas turbo-machine.

4. The gas turbo-machine of claim 3, wherein said machine is a compressor, and the linear dimensions of said second stage are smaller than the linear dimensions of said first stage substantially in accordance with said formula.

5. The gas turbo-machine of claim 4, wherein said first and second stages are substantially isothermal.

6. The gas turbo-machine of claim 5, wherein at least said first stage also includes stator blades, and said stator blades include an inlet and outlet for passing a coolant through said blades to cool the gas to said substantially isothermal conditions before the gas is discharged from said first stage.

7. The gas turbo-machine of claim 4, wherein at least said first stage is substantially adiabatic.

8. The gas turbo-machine of claim 7, including an intercooler between said first stage and said second stage to cool the gas discharged from said first stage before the gas enters the inlet of the second stage.

9. The gas turbo-machine of claim 8, wherein said intercooler cools the gas to substantially the same temperature as the gas introduced to the inlet of said first stage.

10. The gas turbo-machine of claim 3, wherein said machine is a gas turbine, and the linear dimensions of said second stage are larger than the linear dimensions of said first stage substantially in accordance with said formula.

11. The gas turbo-machine of claim 10, wherein said first and second stages are substantially isothermal.

12. The gas turbo-machine of claim 11, wherein at least said first stage also includes a fuel injector which injects fuel into said first stage to heat the gas to said substantially isothermal conditions before it is discharged from said first stage.

13. The gas turbo-machine of claim 10, wherein at least said first stage is substantially adiabatic.

14. The gas turbo-machine of claim 13, including a combustor between said first stage and said second stage which heats the gas discharged from said first stage before the gas enters the inlet of the second stage.

15. The gas turbo-machine of claim 14, wherein said combustor heats the gas to substantially the same temperature as the gas introduced to the inlet of said first stage.

16. The gas turbo-machine of claim 1, wherein said machine is a compressor, and the linear dimensions of said second stage are smaller than the linear dimensions of said first stage substantially in accordance with said formula.

17. The gas turbo-machine of claim 16, wherein said first and second stages are substantially isothermal.

18. The gas turbo-machine of claim 17, wherein at least said first stage also includes stator blades, and said stator blades include an inlet and outlet for passing a coolant through said blades to cool the gas to said substantially isothermal conditions before the gas is discharged from said first stage.

19. The gas turbo-machine of claim 16, wherein at least said first stage is substantially adiabatic.

20. The gas turbo-machine of claim 19, including an intercooler between said first stage and said second stage to cool the gas discharged from said first stage before the gas enters the inlet of the second stage.

21. The gas turbo-machine of claim 20, wherein said intercooler cools the gas to substantially the same temperature as the gas introduced to the inlet of said first stage.

22. The gas turbo-machine of claim 1, wherein said machine is a gas turbine, and the linear dimensions of said second stage are larger than the linear dimensions of said first stage substantially in accordance with said formula.

23. The gas turbo-machine of claim 22, wherein said first and second stages are substantially isothermal.

24. The gas turbo-machine of claim 23, wherein at least said first stage also includes a fuel injector which injects fuel into said first stage to heat the gas to said substantially isothermal conditions before it is discharged from said first stage.

25. The gas turbo-machine of claim 22, wherein at least said first stage is substantially adiabatic.

26. The gas turbo-machine of claim 25, including a combustor between said first stage and said second stage to heat the gas discharged from said first stage before the gas enters the inlet of the second stage.

27. The gas turbo-machine of claim 26, wherein said combustor heats the gas to substantially the same temperature as the gas introduced to the inlet of said first stage.

28. The gas turbo-machine of claim 2, including a generator for generating electrical power, said power transmission shaft mechanically coupling said turbine blades with said generator.

29. The gas turbo-machine of claim 28, including a compressor and a gas turbine, at least one of said compressor and said gas turbine including said first and second stages, and the gas from said compressor is discharged to said gas turbine; and a heat exchanger positioned between said compressor and said gas turbine and in the discharge from said gas turbine to heat the gas being discharged from said compressor before it is introduced to said gas turbine with the heat from the gas which is discharged from said gas turbine.

30. The gas turbo-machine of claim 29, wherein both said compressor and said gas turbine each contain said first and second stages.

31. The gas turbo-machine of claim 29, wherein said compressor contains said first and second stages, and the linear dimensions of said second stage are smaller than the linear dimensions of said first stage substantially-in accordance with said formula.

32. The gas turbo-machine of claim 31, wherein said first and second stages are substantially isothermal.

33. The gas turbo-machine of claim 32, including means for introducing water to said first stage from below the thermocline of a large body of water, wherein said first stage also includes stator blades, and said stator blades include an inlet and outlet for passing said water through said blades to cool the gas to said substantially isothermal conditions before the gas is discharged from said first stage.

34. The gas turbo-machine of claim 31, wherein at least said first stage is substantially adiabatic.

35. The gas turbo-machine of claim 34, including an intercooler between said first stage and said second stage to cool the gas discharged from said first stage before the gas enters the inlet of the second stage.

36. The gas turbo-machine of claim 35, wherein said intercooler cools the gas to substantially the same temperature as the gas introduced to the inlet of said first stage.

37. The gas turbo-machine of claim 36, including means for introducing water to said intercooler from below the thermocline of a large body of water to cool said gas.

38. The gas turbo-machine of claim 29, wherein said gas turbine contains said first and second stages, and the linear dimensions of said second stage are larger than the linear dimensions of said first stage in accordance with said formula.

39. The gas turbo-machine of claim 38, wherein said first and second stages are substantially isothermal.

40. The gas turbo-machine of claim 39, wherein at least said first stage also includes a fuel injector which injects fuel into said first stage to heat the gas to said substantially isothermal conditions before it is discharged from said first stage.

41. The gas turbo-machine of claim 38, wherein at least said first stage is substantially adiabatic.

42. The gas turbo-machine of claim 41, including a combustor between said first stage and said second stage which heats the gas discharged from said first stage before the gas enters the inlet of the second stage.

43. The gas turbo-machine of claim 42, wherein said combustor heats the gas to substantially the same temperature as the gas introduced to the inlet of said first stage.

* * * * *

UNITED STATES PATENT AND TRADEMARK OFFICE
CERTIFICATE OF CORRECTION

PATENT NO.    : 6,260,349 B1
DATED         : July 17, 2001
INVENTOR(S)   : Kenneth F. Giffiths It is certified that error appears in the above-identified patent and that said Letters Patent is hereby corrected as shown below:

Title page,
Item [57], ABSTRACT, "$L = \sqrt[3]{\sqrt{D}}$" should read -- $L = \sqrt[3]{D}$ --.

Column 2,
Line 36, "$L = \sqrt[3]{\sqrt{D}}$" should read -- $L = \sqrt[3]{D}$ --.

Column 6,
Line 12, "S1-" should read -- S1-S5 --.

Column 9,
Line 4, "$L = \sqrt[3]{\sqrt{D}}$" should read -- $L = \sqrt[3]{D}$ --.

Column 10,
Table 1 A, the heading
"Ratio of Ratio of Linear Dimensions L" should be -- Ratio of Linear Dimensions L --

Column 11,
Table 1 B, the heading
"Ratio of Ratio of Linear Dimensions L" should be -- Ratio of Linear Dimensions L --
Table 1 C, the heading
"Ratio of Ratio of Linear Dimensions L" should be -- Ratio of Linear Dimensions L --

Column 13,
Table 2 A, the heading
"Ratio of Ratio of Linear Dimensions L" should be -- Ratio of Linear Dimensions L --

UNITED STATES PATENT AND TRADEMARK OFFICE
CERTIFICATE OF CORRECTION

PATENT NO. : 6,260,349 B1
DATED : July 17, 2001
INVENTOR(S) : Kenneth F. Giffiths It is certified that error appears in the above-identified patent and that said Letters Patent is hereby corrected as shown below:

Column 13 (cont'd)
Table 2A, for each of the Stages 1-5, " $\sqrt[3]{\frac{5}{1}}$ " should be -- $\sqrt[3]{\frac{5}{1}}$ --
Table 2B, the heading
"Ratio of                      -- Ratio of
Ratio of                       Linear
Linear         should be       Dimensions
Dimensions                        L --
   L"

Column 15,
Table 2 C, the heading
"Ratio of                      -- Ratio of
Ratio of                       Linear
Linear         should be       Dimensions
Dimensions                        L --
   L"
Line 50, " $L=\sqrt[3]{D}$ " should be -- $L=\sqrt[3]{D}$ --.

Column 18,
Line 12, "substantially -in" should be -- substantially in --.

Signed and Sealed this

Second Day of September, 2003

JAMES E. ROGAN
*Director of the United States Patent and Trademark Office*